Nov. 12, 1935. E. BILLINGS ET AL Re. 19,750

MANUFACTURE OF PRODUCTS OF CARBON BLACK AND SIMILAR FINE POWDERS

Original Filed Aug. 12, 1933

INVENTORS-
Edmund Billings and
Harold H. Offutt.
by Henry r Witter. atty.

Reissued Nov. 12, 1935 Re. 19,750

UNITED STATES PATENT OFFICE 19,750

MANUFACTURE OF PRODUCTS OF CARBON BLACK AND SIMILAR FINE POWDERS

Edmund Billings, Weston, and Harold H. Offutt, Winchester, Mass., assignors to Godfrey L. Cabot, Inc., Boston, Mass., a corporation of Massachusetts Original No. 1,957,314, dated May 1, 1934, Serial No. 684,884, August 12, 1933. Application for reissue January 19, 1935, Serial No. 2,614

13 Claims. (Cl. 134—58)

Figure 1:
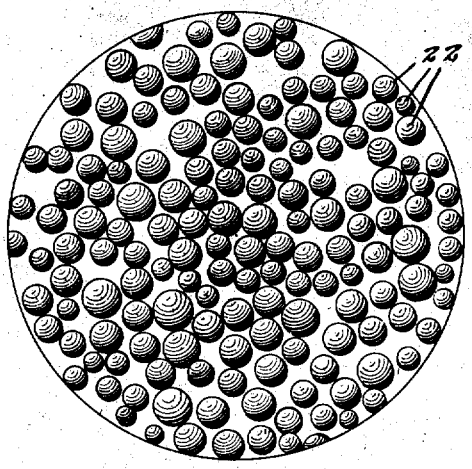

This invention relates to a novel product made from fine dry powders as a result of processes of mechanical treatment solely. In general it applies to the broad field of solid substances which derive their applications in the arts and sciences from their fine state of sub-division. This extreme degree of fineness carries the inevitable and generally undesirable concomitant of dustiness, and this dustiness, arising from the minute weight of the individual particle, may lead to serious undesirable commercial consequences; for example, contamination of other nearby products and processes, excessive deterioration of fixtures, machinery and furnishings and respiratory and other occupational disorders in the workmen exposed to the dust.

We have discovered that certain powdered materials of this type may be agglomerated on themselves, by purely mechanical treatment, without the assistance of binders, solvents, liquids, tars, or the addition, either temporarily or permanently, of any foreign substance. The agglomerates formed by our process are of greater apparent density in bulk than the loose powders from which they are formed and consist of more or less spherical masses having such a high ratio of weight to surface that they are not dusty. Also, they have smooth, polished, non-adherent surfaces and compact, adhesive internal structures. These characteristics give the resulting agglomerates a free-flowing nature which materially simplifies handling in bulk, homogeneous mixing with other materials, delivery by gravity through chutes and pipelines, packaging in any desired weight, and all of the other conveniences imparted to the product by its extreme fluidity and dustlessness.

One important field of use for our invention is the carbon black industry, for example, in connection with the so-called "channel" carbon black produced by burning natural gas flames against metallic surfaces. The ultimate carbon black particle is so small that its shape and exact size are beyond microscopic determination. As first produced, such carbon black has an apparent density in bulk of about three pounds per cubic foot. It has been the practice to increase this apparent density in bulk to about twelve pounds per cubic foot by stirring and then to increase it further to about twenty-five pounds per cubic foot by compressing. The resulting compressed carbon black due to its dusty nature is still inconvenient to handle because it so readily reverts to its dusty form. In addition to this, the difficulties of packaging carbon black by compression have necessitated the employment of small sacks, twenty-five pounds or less in capacity, and for practical reasons the industry has obliged to standardize on two sizes of sacks.

We have found that by subjecting the carbon black of commerce to certain conditions of turbulent pressure, the fine dusty particles of which it is composed may be caused to adhere and agglomerate firmly with each other in groups. Thus the carbon black may be converted into small spherical granules of apparent density in bulk higher than before such treatment, of relatively tenacious structure, with each of such granules presenting a more or less polished, non-adherent surface. Carbon black in this spherical grain form possesses all of the advantages of convenience in handling and distribution above discussed and, in addition, it disperses perfectly in rubber mixtures, and is otherwise as useful or more useful in rubber making and other industries than the compressed carbon black of commerce formerly employed.

Similarly we have found that a number of other fine, dry powders, among them, all of the carbon pigments commonly known as lamp blacks, zinc oxide, iron oxide and clay, (previously reduced to the requisite state of sub-division if necessary) have the property of agglomerating under determinable conditions of mechanical manipulation and that when subjected to suitable turbulent pressure they may be converted into small, tenacious spherical granules of concentric shelled structure and having non-adherent surfaces.

The powders which display this behaviour have certain other characteristics which serve to differentiate them from those powders which cannot be agglomerated by such treatment. For example, if jigged on a vibrating surface, they will agglomerate into small spheres of very fragile structure, they will form an adhesive lump when squeezed, they will adhere to metallic or non-metallic rods when these are forcibly drawn through them and they are free from gummy and resinous ingredients. The present invention has to do with fine powders or pigments having these properties or characteristics and for convenience they will be termed herein as "agglomerative powders".

We have discovered that by subjecting them to the proper conditions of turbulent pressure, and to proper manipulation these agglomerative powders may be converted into spherical granules of greatly increased apparent density, having also internal structures of spherical shells concentrically disposed about central cores, with each granule presenting a smooth, polished, non-adherent and non-coherent exterior surface. The self-generated spherical granules thus produced are of appreciable mechanical strength and, since they have the property of withstanding very considerable direct pressure, they may be handled or transported in bulk with practically no disintegration. The powder, converted into this spherical-grain form, is substantially dustless, free-flowing and non-adherent.

The proper conditions of turbulent pressure necessary for the conversion of agglomerative powders into such spherical granules may be created by the use of various types of mechanical apparatus. One example of suitable apparatus is disclosed in our pending application Serial No. 642,850, filed Nov. 16, 1932. We have found that, under certain conditions, we can directly convert fine agglomerative powders from their loose, seemingly amorphous form into this dense, spherical-grain form. However, the process is usually more rapid, economical and commercially efficient if a priming charge of pre-formed spherical material is mixed with the powder being treated. This priming material may be either the same or different from the powder. If such a priming charge is not used, the first effect of turbulent pressure on the powder may be to cause the gradual formation of a small number of nuclei consisting of a number of powder particles adherently bonded together. Since, in an adequate space of time under turbulent pressure, the nuclei as they form are pressed upon from all sides and in all directions, their growth is in three equal dimensions, thus their form is spherical.

The priming charge serves at least two important purposes, i. e. (1) It immediately provides cores or nuclei upon which the powder may at once begin to adhere thus promoting or expediting formation of a large proportion of spherical, well-agglomerated granules of low viscosity. The resulting lower average viscosity enhances the turbulent effect of the mechanical apparatus used and thereby accelerates the conversion from powder to dustless spherical agglomerate. (2) It provides immediately bodies of much larger weight than the weight of the particles of dust. These larger bodies, by collision, provide impacts on the dust particles of sufficient intensity to cause permanent adhesion. They also widen the zones of effective action in the apparatus and so permit the use of greater clearances than would otherwise be the case, thereby simplifying the mechanical construction of the apparatus.

There are a number of ways of producing satisfactory priming charge material but all are alternative methods for accomplishing two purposes; first, exerting sufficient pressure on the powder particles to form firm adhesions; second reduction of the agglomerates thus formed to a convenient and suitable size and with three appreciable dimensions. For example, satisfactory cores may be secured from some agglomerative powders by subjecting relatively thin layers of the powders to direct compression, sufficiently heavy to cause the formation of a chunk, cake or briquette. This, if then rubbed through a wire screen of suitable mesh, is partially disintegrated and the resulting product of this treatment is suitable for core material and may be readily built up into spherical form by the addition of concentric external layers or shells.

As another example, spheres of foreign material of suitable density and size, may be mixed with the agglomerative powder and the mixture subjected to turbulent pressure. The powder will then form a substantially concentric, spherical shell on each sphere. If the composite spherical granules thus formed are rubbed upon a screen of the proper mesh to exclude the original spheres, they will break and fragments of the shells passing through the screen will be found sufficiently dense and adhesive to serve as priming material for the subsequent agglomeration of powders of their own nature. Examples of spheres suitable for this purpose are fine shot or seeds, such as those of the beet, clover or petunia.

Likewise composite granules may be formed by using cores made from one powder with shells formed from an entirely different powder, for use where a free-flowing dustless mixture of two or more such powders is commercially desired.

An important feature of our invention lies in our discovery of the fact that we are able to take these small agglomerates, which may be so fine as to partake of the characteristics of dust, and build them, through successive addition of shells, to a size that imparts to the product the commercial advantages above discussed, viz., dustlessness, high density, low mass viscosity, spherical shape and non-adherent surface.

Another important feature of our invention lies in our discovery of the further fact that we can alter and control the degree of surface polish imparted to the granules since, under proper conditions, this is a function of time of treatment.

Our ability to control the degree of surface polish enables us:

1—To control the viscosity of the material in bulk, thus facilitating handling.

2—To offset the increase in viscosity in bulk which would otherwise naturally accompany increase in average diameter of the individual spheres.

Thus, ability to control polish enables us to maintain adequate turbulent pressures throughout a wide range of average sphere diameter and thus to add a greater number of concentric shells and produce larger and more useful spherical agglomerates.

Since the impacts delivered by one sphere to another are a function of the weight of the spheres, it becomes possible to increase rapidly the density of the spherical granules in process of treatment by employing a priming charge of large spheres. We may, by proper manipulation and adequate time of treatment, thus cause the density of granules to approach the absolute specific gravity of the material being treated. This is another characteristic and extremely important feature of our invention.

For purposes of illustration, the invention will now be more specifically described as carried out in connection with the production of spherical grain carbon black. In the accompanying drawing, Fig. 1 represents spherical grain carbon black as seen in the field of a microscope, magnified 50 diameters.

Figure 2:
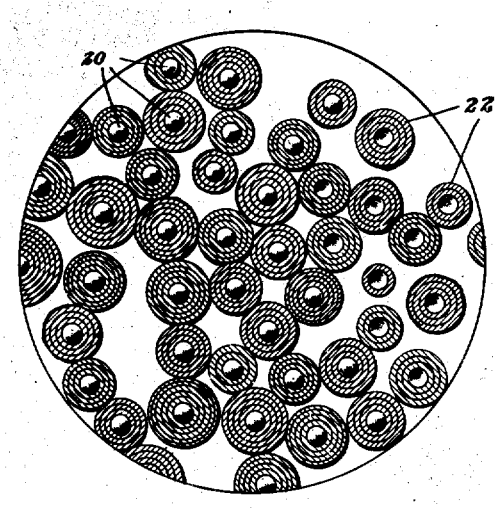

Fig. 2 represents spherical grain zinc oxide, the granules being shown in cross section in the field of a microscope, magnified 60 diameters.

Figure 3:
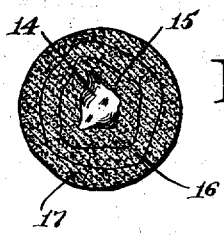
Figure 4:
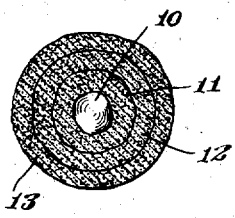
Figure 6:
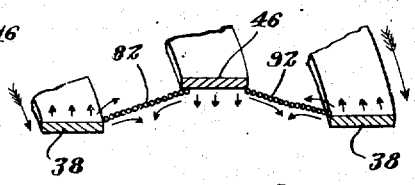
Figure 5:
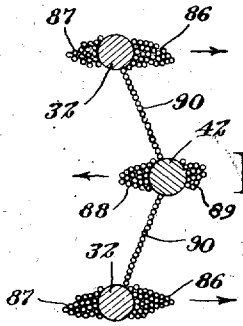

Figs. 3 and 4 are sectional views of single spherical granules, magnified 300 diameters; and Figs. 5 and 6 represent diagrammatically the conversion process as carried out by one form of suitable apparatus.

In the preparation of spherical grain carbon black from the carbon black of commerce, the cores may be first produced separately by subjecting the seemingly amorphous powder to prolonged treatment under conditions of adequate turbulent pressure. The cores thus produced present a smooth, non-adherent surface and may conveniently have an apparent density in bulk of more than 12 pounds per cubic foot, for example, about 18 to 20 pounds per cubic foot. The average size of these cores, as measured by sieve tests, is determined by the degrees of turbulence and pressure to which the powder is subjected. The optimum size is determined by the number of concentric shell-like layers which are subsequently to be added to the core and by the design of the apparatus in which the additions are made. For carbon black, an average core diameter ranging from 300 mesh to 60 mesh has been found satisfactory.

Substantially equal amounts of these cores and of commercial carbon black may now be introduced into an apparatus such, for example, as that disclosed in our pending application Serial No. 642,850. This apparatus comprises a drum which constitutes a container and in which are arranged a plurality of impelling elements and baffle elements movable past each other in an approaching and receding manner and provided with means to cause also an up-and-down circulation in the mass delivered thereto. The composite charge may be thus subjected to pressure and to turbulence causing this pressure to be multi-directional upon each particle thereof. This is accompanied by a sliding or shifting action of the mass upon itself under conditions of pressure and a stroking or polishing interaction of its particles. Under these conditions there occurs an agglomeration of the flocculent carbon black upon the cores or fines with the result that a spherical shell is built up upon each core.

In Fig. 4 of the drawing is shown a core 10 upon which has been formed a concentric shell 11. This figure represents a single granule of spherical-grain carbon black at high magnification, the core being shown in elevation and the concentric shells in section.

The process may be continued until all of the flocculent carbon black has been agglomerated upon the cores in the form of spherical shells and if the components of the initial charges are substantially equal, it is apparent that each shell will comprise substantially 50% of the weight of the spherical grain thus formed. It is desirable to continue the process for a time after the disappearance of the flocculent carbon black from the apparatus sufficient to polish the surfaces of the spherical grains. At this stage the entire charge has been converted to spherical granules of high apparent density, the individual granules being sufficiently tenacious to stand such pressures as they may be subjected to in handling, and presenting a more or less polished non-adherent surface. If the process is continued further, the granules tend to become more and more dense and to be reduced in diameter. The process may be stopped when the spherical granules have thus reached a convenient commercial density and polish.

We have described the production of spherical granules comprising a core and a single concentric shell by a single regenerative process terminating when an equal weight of flocculent carbon black has been agglomerated upon each core. If desired, a new charge of flocculent carbon black may now be introduced into the apparatus and, as before, this may approximately equal in weight the amount of the spherical grain charge already produced or remaining therein. The process is now renewed as before and a second concentric shell agglomerated upon the outer surface of the first. Such a second shell is indicated by reference character 12 in Fig. 4 of the drawing. When the flocculent carbon black of the charge has again agglomerated, the process may be repeated. In Fig. 4 a third concentric shell 13 is shown and in Fig. 2 are shown granules having as many as six concentric shells agglomerated about the core. What has already been said applies to these additional regenerative processes. The core and each shell is defined by a polished or somewhat glazed spherical surface upon which the next larger shell is agglomerated and to which it directly coheres. These surfaces may be readily detected as surfaces of cleavage or division in partially crushed or sectioned spherical granules.

Fig. 1 represents spherical-grain carbon black or of other agglomerative powders as seen in the field of a microscope in the magnification of 50 diameters. It will be noted that all the grains are spherical or substantially so and that there is a substantially uniform upper limit of diameter which has been attained by a large number of the granules. The smaller granules represent those which contain in their composition a smaller number of concentric shells than the larger granules, or the shells of which are thinner.

We have found that in the case of carbon black subjected to treatment in the type of apparatus described in our pending application Serial No. 642,850, it is best to use a priming charge not coarser than 60 mesh if an increment of equal volume is to be added in the form of a shell, because the resulting spherical grains produced by such an increment will then have a size of about 40 mesh and, using carbon black, we have found that the subjection to turbulent pressure of a charge of spherical grain carbon black containing a substantial percentage of grains substantially larger than 40 mesh in the type of apparatus described, results in viscosities and pressures so great as to crack and burst the granular agglomerates, thus reproducing sticky, dusty material from the free-flowing, dustless charge. For this reason, when treating carbon black by the above process, we have found it advantageous to start with a priming charge in the range of 150 mesh so that a large number of concentric shells could be added before reaching the limiting size.

As the diameter of the spherical grains increases with the addition to them of successive increments of carbon black, and also as the application of turbulent pressure is continued after all the flocculent carbon black has been applied to the cores of the priming charge, some of the shells become ruptured into fragments but not into dust, and these fragments, in the presence of their neighbors, round off and become to all intents and purposes new core material. This process continues throughout the run and results in a decrease of the average size of the agglomerates with time of running. It is also to be understood that it is the natural tendency of all these agglomerates to become smaller with time of running because of increase in density due to the impacts and pressures applied to their surfaces.

At the conclusion of the first cycle of the operation the finished charge may be withdrawn from the apparatus and in this condition constitutes a satisfactory and valuable commercial product. It is usually preferable, however, to sift the material at the end of each cycle, separating the smaller agglomerates from the mass so that they may be used as priming material for new charges, and retaining in the finished product only agglomerates of the larger sizes.

In the light of our present knowledge, we may suggest one theory of what takes place within the drum to cause the carbon black to assume its new and relatively dense form by reference to Figs. 5 and 6 of the drawing. The stationary elements 42 are arranged alternately with the moving elements 32 and the charge of black surrounds and entirely fills the space between these elements. As the elements 32 move relative to the elements 42 (Fig. 5), they tend to carry the black in a mass therewith but such movement of the black is opposed by the stationary elements 42. The result is that cones 86 and 87 of black form both forwardly and rearwardly of the elements 32 and move along with these elements, while cones 88 and 89 of black form both forwardly and rearwardly of the elements 42 remain stationary therewith. The carbon black intermediate the elements 32 and 42 (indicated by line 90 of black particles in Fig. 5) is in a state of turbulence, the black adjacent to the elements 32 moving nearly as fast as those elements and the carbon black adjacent to the elements 42 remaining nearly stationary. The relative positions of the elements are constantly changing as the elements 32 approach and recede from the elements 42 and, due to this action, the particles of carbon black are alternatively being brought into most intimate and bombarding relation whereby they are compacted into the relatively dense form of the finished product and into a relatively loose relation, wherein they are free to rearrange themselves for the next impact. Thus the black particles are intermittently subjected to pressures or impacts and are relatively rearranged between the successive impacts, such impacts or pressures thereby becoming multi-directional, i. e. not occurring twice in succession in the same direction.

If the cores are formed from compressed or briquetted material, we have found it advantageous to subject the rough fragments resulting from this method to turbulent pressure for a short period. This treatment breaks off the rough irregular projections of such cores, tends to equalize the three dimensions, fills in the cavities with the detritus resulting from the abrasion of the projections and thus produces cores which are more nearly perfect spheres. This condition is desirable because the more nearly spherical the priming charge, the lower the viscosity of the subsequent mixture with the agglomerative powder. Lower viscosity, within limits, enhances the turbulent pressure effects of our apparatus and thus assists the conversion process. If the core is spherical to start with, the shell agglomerated thereon will also be spherical. If the core is irregular in its shape, the shell will not be perfectly spherical but will tend to approach spherical shape more nearly than the core. In Fig. 3 is shown a core 14 of more or less irregular shape, such as might be found by the compressing and breaking process, and upon this has been formed a shell 15. This, it will be noted tends to fill in and smooth out the surface irregularities of the core and to approach spherical shape.

Fig. 2 represents spherical granules of zinc oxide which have been imbedded in a transparent medium and then sectioned, as seen in the field of a microscope in the magnification of 60 diameters. In this view, the cores 20 of certain granules are shown in place where as other granules 22 are shown as having lost their cores. These were displaced and lost in the operation of sectioning the spherical granules.

The limiting size of the agglomerates depends somewhat upon the design and operation of the agglomerating apparatus used for producing the requisite turbulent pressures, but is even more dependent upon the nature of the agglomerative powder being treated. Zinc oxide, for example, can be caused to agglomerate by increments into spheres of larger than 20 mesh before the resulting increased pressure exceeds the structural resistance of the spherical grains and break-down into dust ensues.

The continuous tendency toward the replacement of fine material as the process is carried out is advantageous for two reasons:

1. It maintains the distribution of particle sizes.

2. It affords a continuous replacement of fine material for the start of new cycles if these fine particles are screened out at the end of each run, thus removing the necessity for a separate and distinct process or step for the production of cores.

The distribution of particle sizes is important to the process for three reasons:

1. It decreases the viscosity of the charge by providing supporting surfaces in the interstices between the larger particles, thus increasing the ability of the apparatus to produce adequate turbulent pressures.

2. It decreases the liability of the material to be ruptured or crushed by conveying, transportation, or handling, thus inhibiting the premature return of the spherical grains to their original, dusty fine components.

3. It increases the apparent density in bulk of the commercial product over that which would obtain if only one size of particle were present, thus economizing on packing materials and storage space per unit weight.

While in describing the process of our invention as carried out in connection with carbon black, we have suggested the addition of an equal weight of flocculent material to the priming charge, it is entirely practicable to double this proportion, that is, to add flocculent carbon black in an amount equal to twice the weight of the priming charge. The percentage of priming material necessary or advisable in the charge is a function of the combined viscosities of the priming material and the fine powder. From this it follows that it is possible to use a 5% or 10% priming charge in treating certain powders, whereas a 33% priming charge may be required in treating other fine powders. In the case of carbon black, a 33% priming charge is the minimum below which it is not convenient to go.

This application is, in part, a continuation of our earlier application, Serial No. 623,184, filed July 18, 1932, and corresponding to our Canadian patent, No. 333,741, granted July 4, 1933.

Having thus described our invention, what we claim as new and desire to secure by Letters Patent of the United States is:

1. As a new product of manufacture, carbon black in the form of spherical granules having a relatively tenacious internal structure consisting of concentric shells of progressively increasing diameters bonded together with sufficient tenacity to withstand transportation in bulk without distintegration, the granules presenting polished exterior surfaces and having an apparent density in bulk of more than 12 pounds per cubic foot.

2. As a new product of manufacture, carbon black in the form of spherical granules comprising in internal structure a central core with a plurality of concentric spherical shells enclosing the same and united to each other with sufficient tenacity to withstand disintegration when transported in bulk, the granules presenting smooth, non-adherent exterior surfaces and having an apparent density in bulk of at least 18 pounds per cubic foot.

3. As a manufactured product, carbon black in the form of spherical granules between 300 mesh and 20 mesh in diameter, of more than 12 pounds per cubic foot in apparent density and each comprising a dense compact core surrounded by a spherical shell of substantially the same density as the core and built up progressively upon the core by the application of turbulent pressure to flocculent carbon black with sufficient cohesiveness to maintain its identity and adapt the granules to withstand disintegration when transported in bulk and presenting a smooth, non-adherent exterior surface.

4. As a manufactured product, carbon black in the form of spherical granules each comprising an integral coherent core surrounded by a series of concentric shells of substantially equal density, each sufficiently cohesive to maintain its identity when the granule is cut in cross section, presenting a spherical exterior light-reflecting surface and being tenaciously bonded with the core sufficiently to withstand disintegration when transported in bulk.

5. A new product of manufacture, consisting of carbon black in the form of solid spherical granules between 300 mesh and 20 mesh in diameter, having hard, impact-formed, non-adherent surfaces and a compact, dense structure of pure carbon black particles built up systematically and progressively by application of turbulent pressure to flocculent carbon black, the particles being united only by their own cohesive force with sufficient tenacity of structure to resist disintegration when transported in bulk, and having a density of more than 12 pounds per cubic foot.

6. A new product of manufacture, consisting of carbon black in the form of solid spherical granules between 300 mesh and 20 mesh in diameter and each having a smooth, impact-formed, non-adherent surface and a dense sturdy structure built up progressively and systematically by application of turbulent pressure to flocculent carbon black, and having an apparent density of more than 12 pounds per cubic foot.

7. A new product of manufacture, consisting of carbon black in the form of substantially spherical granules between 300 mesh and 20 mesh in diameter, and fragments of such spherical granules, said spherical granules having polished non-adherent surfaces, an apparent density of not less than 12 pounds per cubic foot and a compact dense internal structure of pure carbon black particles arranged systematically in forcible engagement with each other by turbulent pressure and maintained by their own cohesive force with such tenacity of structure as to withstand disintegration when transported in bulk.

8. As a new product of manufacture, fine dry agglomerative powder in the form of solid, tenacious, substantially spherical granules not over 20-mesh in diameter and comprising in their internal structure distinct concentric shells of progressively increasing diameter bonded together only by the impact-generated cohesion of the particles of the powder, the granules presenting polished exterior surfaces and being adapted by reason of their structure to withstand transportation in bulk without disintegration.

9. As a new product of manufacture, fine dry agglomerative powder in the form of solid, substantially spherical granules comprising in their internal structure concentric shells, each intact, of substantially equal density and bonded together only by the impact-generated cohesion of the particles of the powder with sufficient tenacity to withstand the pressure of transportation in bulk without substantial disintegration and presenting a polished, non-adherent exterior surface.

10. As a new product of manufacture, fine dry agglomerative powder in the form of solid, substantially spherical granules of sufficient mechanical strength to withstand disintegration when handled in bulk and of greater apparent density than the loose powder, each granule comprising a series of distinct impact-formed concentric shells united in an integral body only by the impact-generated cohesion of the particles of the powder and presenting a smooth non-adherent surface.

11. A new product of manufacture, consisting of fine dry agglomerative powder in the form of solid, substantially spherical granules between 300-mesh and 20-mesh in diameter, having hard impact-formed non-adherent surfaces and a compact dense structure of the pure agglomerative powder built up systematically and progressively by the application of turbulent pressure to the dry powder, the particles being united only by their own cohesive force with sufficient tenacity of structure to resist disintegration when transported in bulk, and having an apparent density in bulk greater than that of the powder.

12. As a manufactured product, a fine dry powder of zinc oxide agglomerated in the form of spherical granules having an internal structure sufficiently tenacious to withstand disintegration when handled in bulk and consisting of a substantially spherical core and a concentric shell built up progressively and systematically by the application of turbulent pressure to the zinc oxide powder and united thereto by impact-generated cohesion of the zinc oxide particles and presenting a polished exterior surface.

13. As a manufactured product, a fine dry powder of zinc oxide agglomerated in the form of solid spherical granules between 300-mesh and 20-mesh in diameter and each having a smooth impact-formed non-adherent surface and a dense sturdy structure built up progressively and systematically by the application of turbulent pressure to the free dry powder of zinc oxide and having an apparent density of more than 20 pounds per cubic foot.

EDMUND BILLINGS.
HAROLD H. OFFUTT.